(12) United States Patent
Kuwabara (10) Patent No.: US 7,458,721 B2
(45) Date of Patent: Dec. 2, 2008

(54) LINEAR MOTION ROLLING GUIDE UNIT

(75) Inventor: Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 319 days.

(21) Appl. No.: 11/388,456

(22) Filed: Mar. 24, 2006

(65) Prior Publication Data

US 2006/0222273 A1    Oct. 5, 2006

(30) Foreign Application Priority Data

Mar. 29, 2005    (JP) .............................. 2005-093947

(51) Int. Cl.
*F16C 29/06* (2006.01)
(52) U.S. Cl. ....................................................... 384/44
(58) Field of Classification Search .............. 384/43–45
See application file for complete search history.

(56) References Cited

U.S. PATENT DOCUMENTS

| | | | | |
|---|---|---|---|---|
| 5,193,914 A | * | 3/1993 | Tanaka | 384/45 |
| 5,800,064 A | * | 9/1998 | Ohya | 384/44 |
| 7,044,641 B2 | * | 5/2006 | Scotte et al. | 384/44 |

* cited by examiner

*Primary Examiner*—Thomas R Hannon
(74) *Attorney, Agent, or Firm*—WolfBlock LLP (57) ABSTRACT

A reduction of the number of parts and the prevention of a gap and a difference in level from occurring in the passage route of the rollers. A slider S is provided with a pair of guide holes 31, 32 for forming a return guide path. Guide cylinders 34 in which the rollers 37 roll are inserted in the guide holes 31, 32. A pair of passage groove 42, 43 having different depth and intersecting with each other is provided in each of the end caps e1, e2. A divider frame 36 is provided integrally with one end of each guide cylinder 34 for defining the intersecting passage grooves. The divider frame 36 is inserted in a cross portion of the intersecting passage grooves, whereby the outward guide path and the return guide path are defined while still intersecting.

2 Claims, 15 Drawing Sheets

LINEAR MOTION ROLLING GUIDE UNIT

BACKGROUND OF THE INVENTION

1. Field of the Invention

This invention relates to a linear motion rolling guide unit providing guide operation by rolling rollers on four raceway faces formed in a track-rail having raceway face.

2. Description of the Related Art

One of the conventional linear motion rolling units of the type described above is illustrated in FIGS. 13 to 19. The conventional unit has a pair of raceway faces formed on each side face of a track-rail R, that is, the lower raceway faces 1a, 2a and the upper raceway faces 1b, 2b. The lower and upper raceway faces 1a and 1b, 2a and 2b, are positioned forming an approximate right angle with each other. A recessed portion 3 is formed between the lower raceway face 1a and the upper raceway face 1b. Likewise, a recessed portion 4 is formed between the lower raceway face 2a and the upper raceway face 2b.

A slider S runs on the track rail R having such raceway faces. The slider S includes end caps 5 and 6 respectively combined with the front and back ends of a casing c. The casing c and the end caps 5 and 6 straddle the track-rail R having the raceway faces, to move along the track-rail R. The slider S is bilaterally symmetrical with respect to the axis the track-rail R having the raceway faces. Therefore, the structural elements in bilateral symmetry will be hereinafter described by use of the same reference numerals or symbols. The description is given relating only to the raceway faces 1a and 1b as a representative example.

Figure 14:
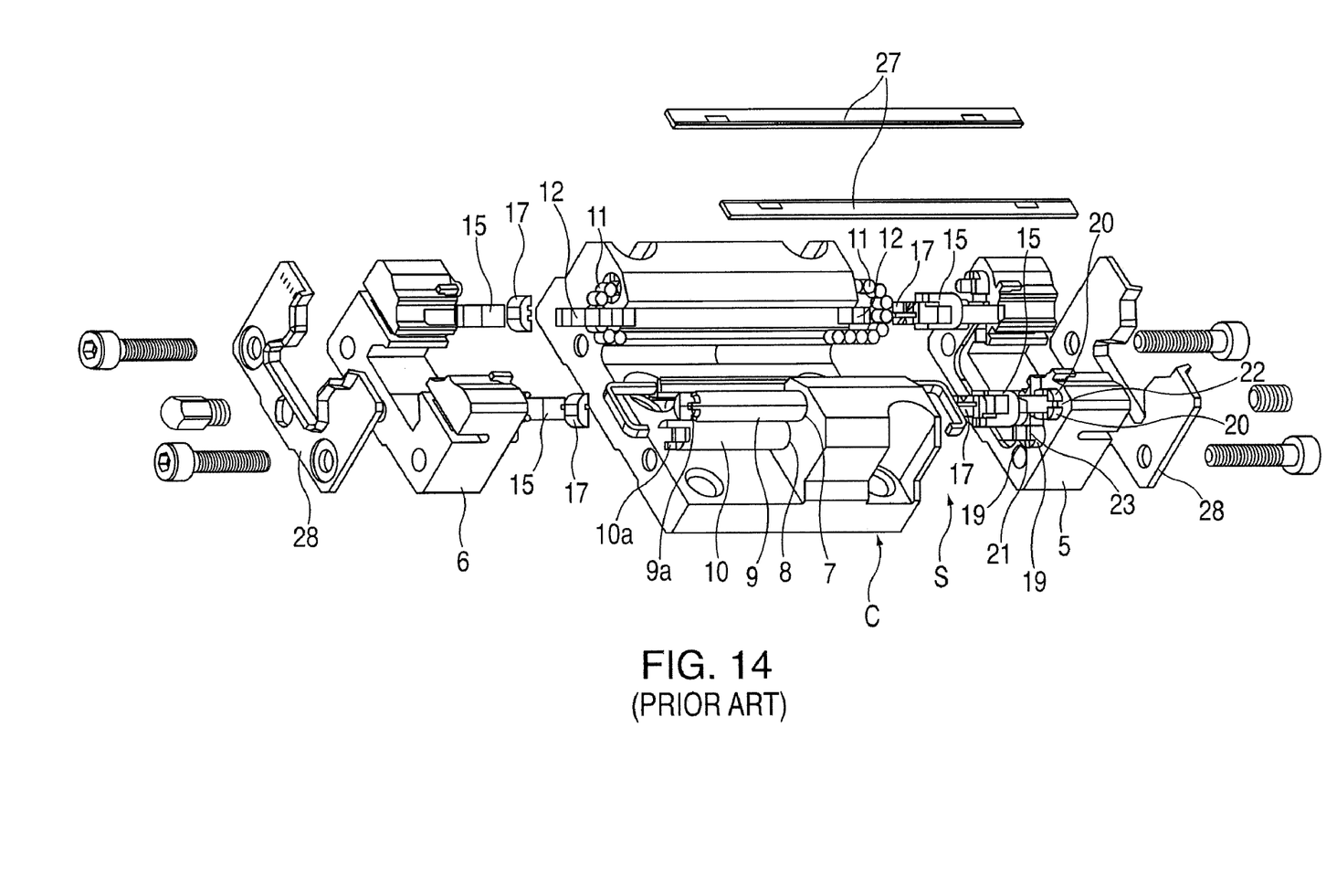
FIG. 14 is a perspective exploded view of the conventional guide unit.

A pair of guide holes 7 and 8 is located in the casing c to extend flush with and parallel to the raceway faces 1a and 1b (and to the raceway faces 2a and 2b) formed on the track-rail R. The guide holes 7 and 8 extend through the casing c in the axis direction and are parallel to each other in upper and lower positions. Guide cylinders 9 and 10 shown in FIG. 14 are respectively inserted into the guide holes 7 and 8.

Each of the guide cylinders 9 and 10 is made up by combining two semicircular cylinder members together. Rollers 11 and 12 roll in the respective guide cylinders 9 and 10 in a such manner as to be parallel to the respective raceway faces 1a and 1b (to the respective raceway faces 2a and 2b). As can be seen from FIG. 13, the rollers 11, after rolling in the guide cylinder 9 of the upper guide hole 7, are guided in a direction that brings them into contact with the lower raceway face 1a (2a), while the rollers 12, after rolling in the guide cylinder 10 of the lower guide hole 8, are guided in a direction that brings them into contact with the upper raceway face 1b (2b). In this manner, the rollers 11 and 12 individually alternate between the upper and lower positions during their rolling movement, and the turning points are provided in the end caps 5 and 6.

Figure 15:
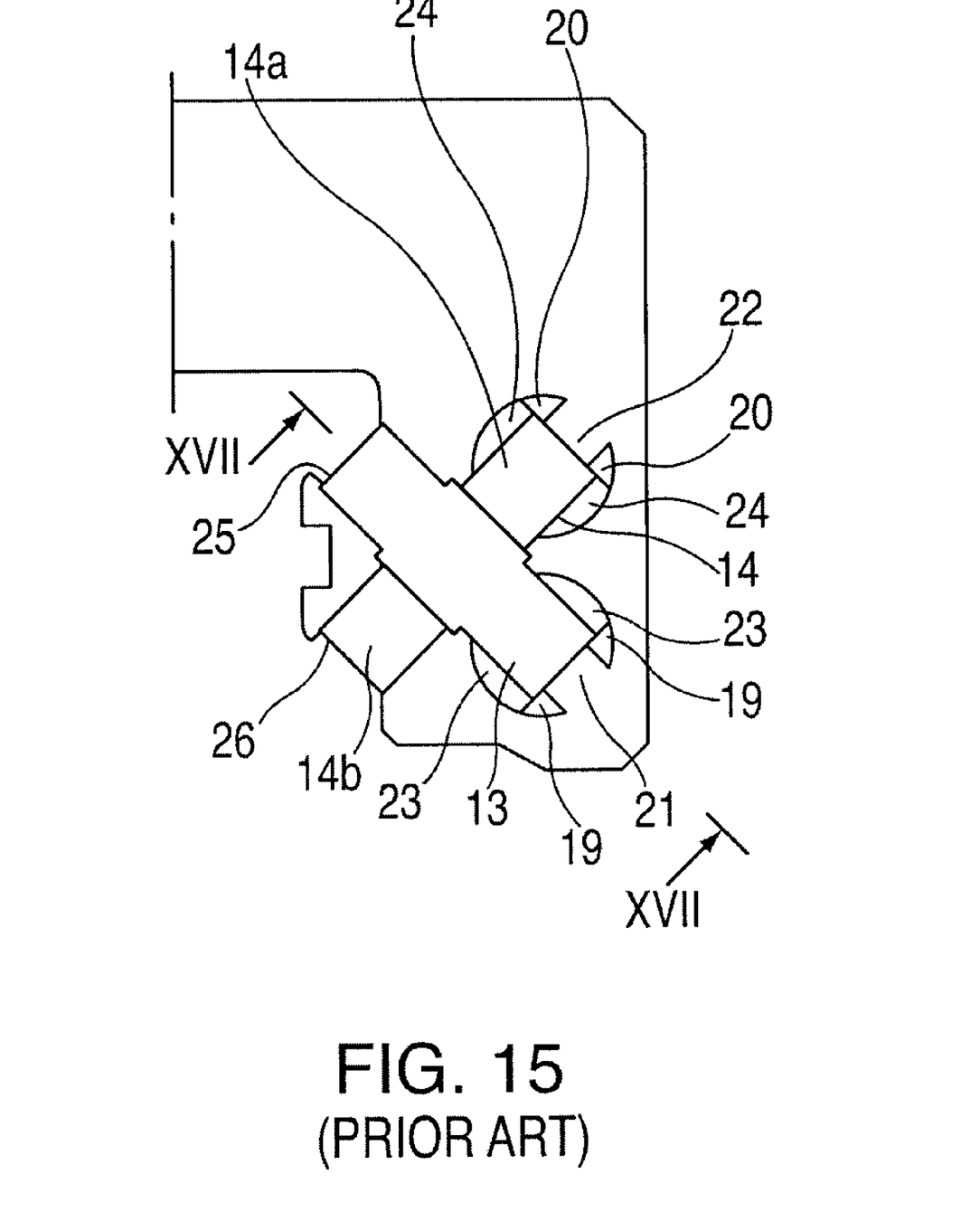
FIG. 15 is a view of a conventional end cap when viewed from a casing.
Figure 16:
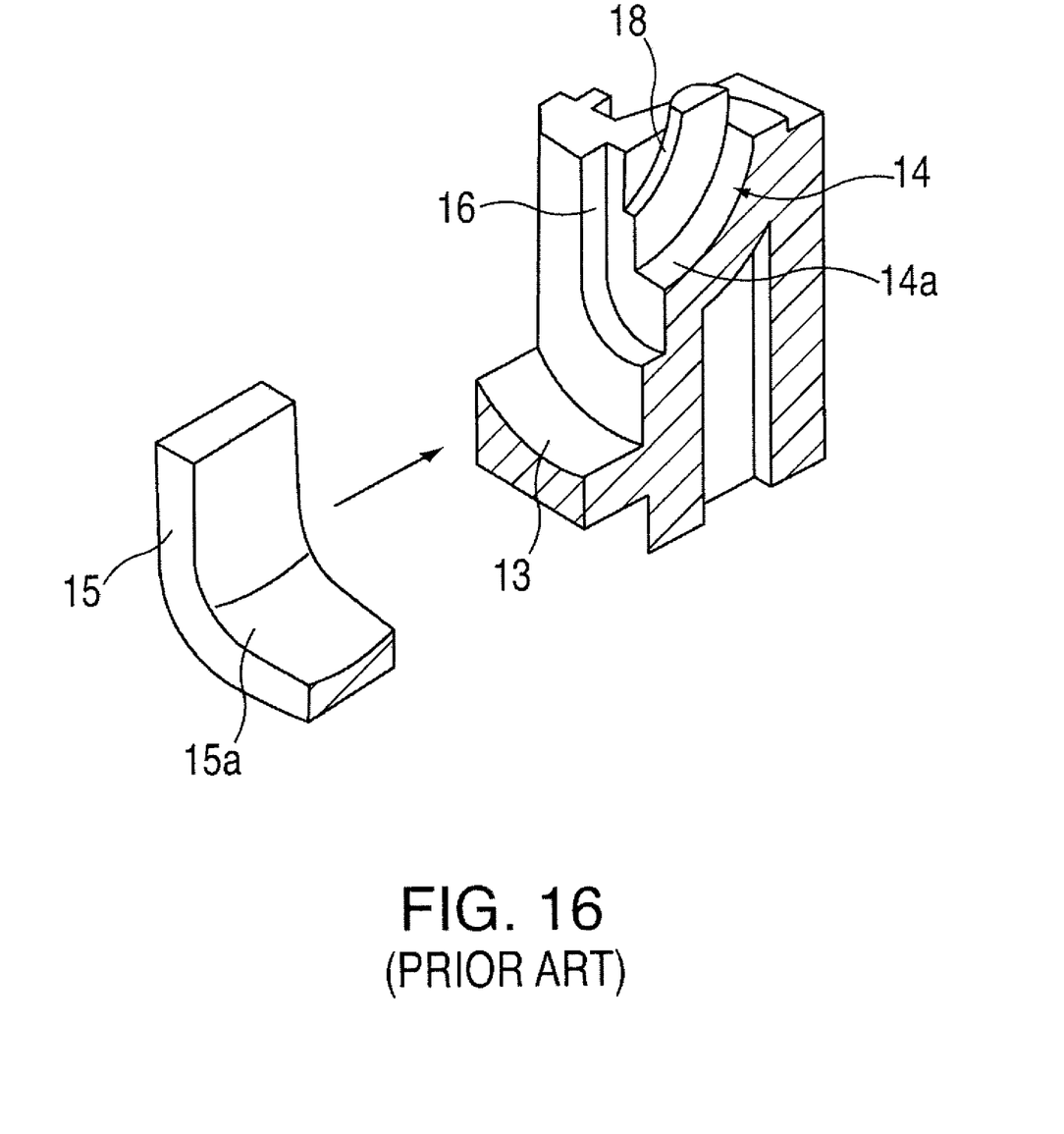
FIG. 16 is a partial perspective view including a partial sectional view of the conventional end cap.
Figure 17:
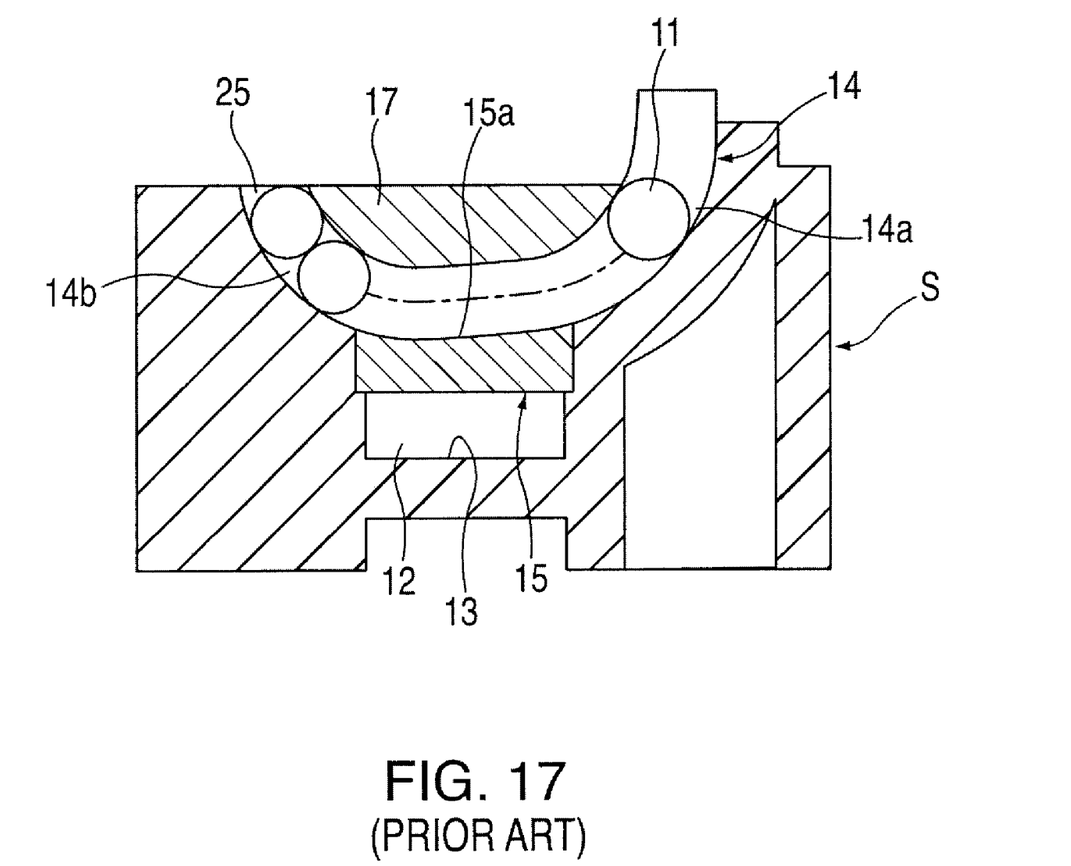
FIG. 17 is a sectional view of the conventional end cap with a cap member, taken along the line XVII-XVII line in FIG. 15.
Figure 18:
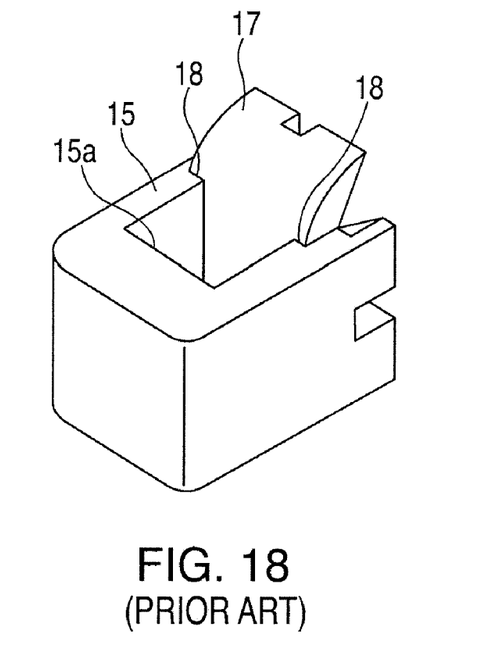
FIG. 18 is a perspective view of a bridge member to be incorporated in the conventional end cap.

As shown in FIG. 15, a pair of intersecting passage grooves 13 and 14 is provided in each of the end caps 5 and 6. The passage groove 13 is deeper than the passage groove 14, as shown in FIG. 16. The passage groove 13 would obstruct the continuity of the passage groove 14. To avoid this, a bridge member 15 as illustrated in FIG. 16 is installed across the location where the continuity is obstructed. The bridge member 15 has a U-shaped end face. As can be seen from FIG. 16, the bottom 15a is formed in an arc shape continuous with the groove portions 14a and 14b of the passage groove 14. The U-shaped bridge member 15 rests on bridge steps 16 which are provided parallel to the passage groove 13. FIG. 17 illustrates the bridge member 15 on the bridge steps 16.

FIG. 17 illustrates the end cap 5. By mounting the bridge member 15 in this manner, the groove portion 14a, the bottom 15a and the groove portion 14b are connected continuously to each other to form the passage groove 14. By mounting the bridge member 15 as shown in FIG. 17, the passage grooves 13 and 14 are defined by the bridge member 15 and intersect with each other in a multilevel manner in a position corresponding to the bridge member 15. FIG. 17 further shows a cap member 17 which is mounted in a direction at right angles to the passage groove 14 and has two ends resting on supporting steps 18 as shown in FIG. 16.

Two pairs of convexities 19 and 20 are provided on the respective ends of the passage grooves 13 and 14 which are father away from the track-rail R having the raceway faces, as shown in FIG. 15. A fitting recess 21 is formed between the pair of convexities 19, and a fitting recess 22 is formed between the pair of convexities 20. Two pairs of convexities 23 and 24 are provided one step higher up than the respective pairs of convexities 19 and 20. The outer peripheries of the convexities 19 and 23 are combined together to form an arc shape in alignment with the outer periphery of the guide cylinder 9, and likewise the outer peripheries of the convexities 20 and 24 are combined together to form an arc shape in alignment with the outer periphery of the guide cylinder 10.

As is clear from FIG. 14, projections 9a and 10a are provided at ends of the guide cylinders 9 and 10, and designed to be tightly fitted into the respective fitting recesses 21 and 22. By tightly fitting the projections 9a and 10a into the fitting recesses 21 and 22, each of the guide cylinders 9 and 10 which are each made up of two members is kept in one piece. The ends of the guide cylinders 9 and 10 with the projections 9a and 10a fitted into the fitting recesses 21 and 22 are in contact with the convexities 19, 20 and the convexities 23, 24, so that the continuity between the guide cylinders 9 and 10 and the respective passage grooves 13 and 14 is maintained.

Figure 13:
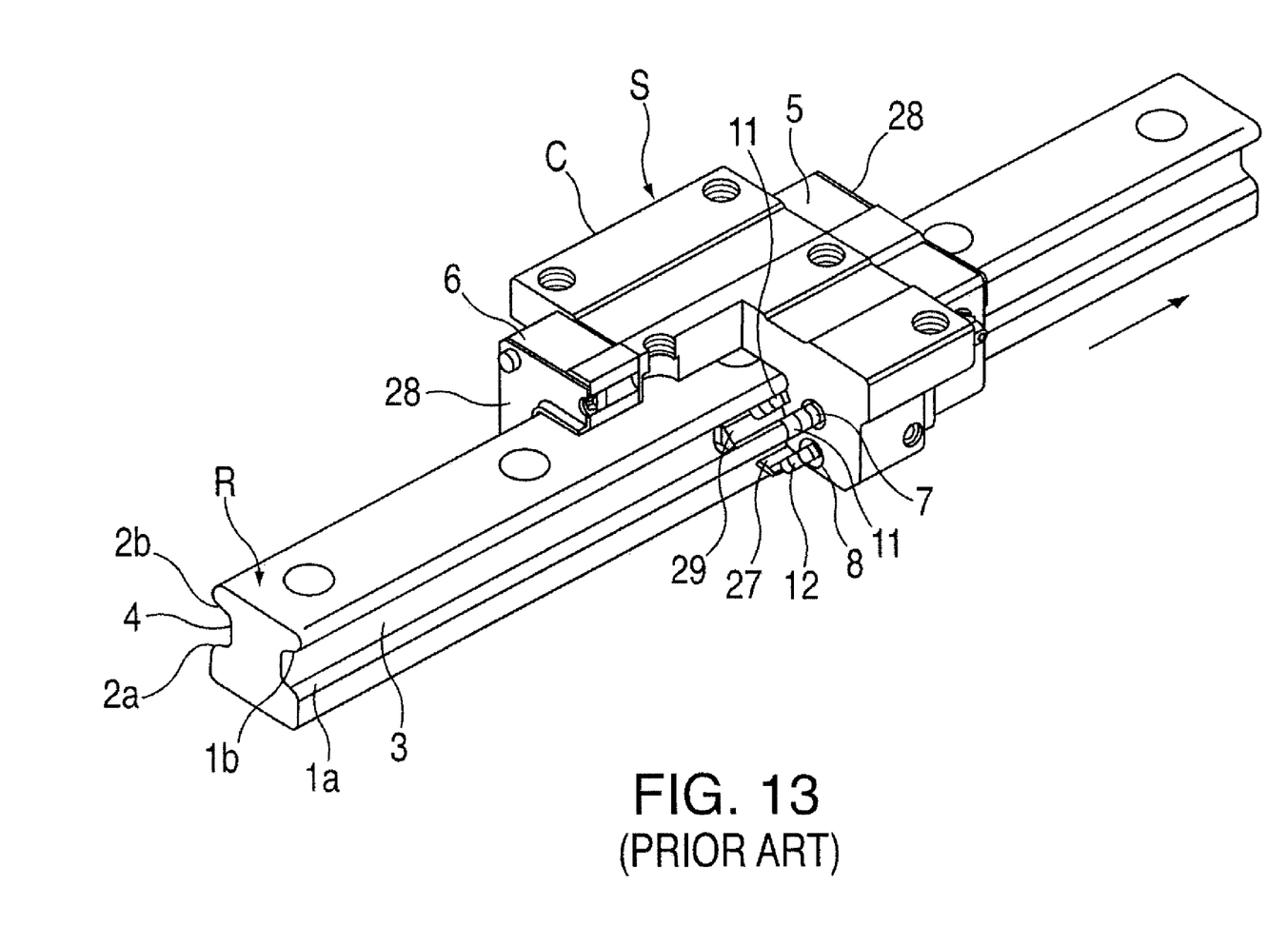
FIG. 13 is a perspective view with a partial sectional view illustrating a conventional linear motion rolling guide unit.
Figure 19:
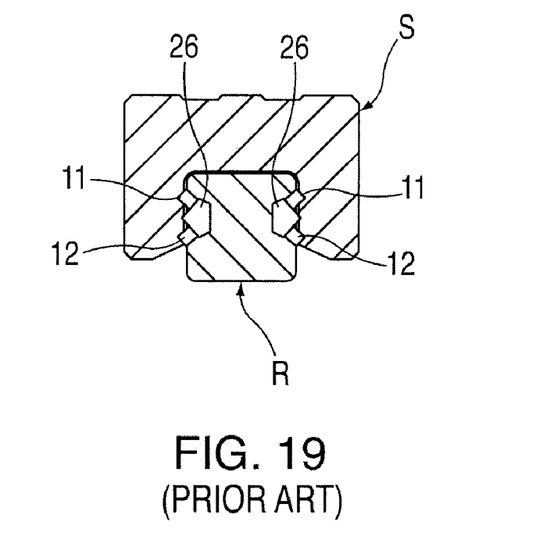
FIG. 19 is a sectional view of the conventional slider straddling a track-rail having raceway faces.

Accordingly, the rollers 11 and 12, which have been respectively guided from the guide cylinders 9 and 10 to the passage grooves 13 and 14, are further guided from access portions 25 and 26 which are the other ends of the passage grooves 13 and 14, onto the lower raceway face 1a and the upper raceway face 1b of the track-rail R having the raceway faces. Alternatively, the rollers 11 and 12, which have reached the end cap 5 or 6 from the lower raceway face 1a and the upper raceway face 1b, are then guided from the access portions 25 and 26 into the passage grooves 13 and 14. Note that FIG. 19 is a sectional view of the slider S straddling the track-rail R having the raceway faces. FIG. 13 also shows a retaining plate 29 provided for preventing the rollers 11 and 12 guided from the access portions 25 and 26 as described above from falling out of the slider S.

FIG. 14 also shows underside sealing members 27 that are provided for sealing the underside of the slider S for preventing the intrusion of dust and the like from the underside to the slider. In addition, end seal members 28 are provided on the outer sides of the respective end caps 5 and 6 for preventing the intrusion of dust and the like from the directions of movement of the slider.

Upon the movement of the slider S along the track-rail R having the raceway faces, the rollers 11 and 12 installed in the slider S roll along move on the raceway faces 1a and 1b (and 2a and 2b) to ensure a smooth movement of the slider S. The following is the moving path of the rollers 11 and 12.

In accordance with the moving direction of the slider S, for example, the rollers 11 and 12 are introduced from the access portions 25 and 26 shown in FIG. 15 into the passage grooves 13 and 14 or onto the raceway faces 1a and 1b (also 2a and 2b). First, the case of the rollers 11 and 12 introduced from the access portions 25 and 26 into the passage grooves 13 and 14.

Let us assume the slider S is moved and the rollers 11 are introduced from the access portion 25 and the rollers 12 are introduced from the access portion 26 of the end cap 5 or 6 which is located to the rear of the moving direction of the slider S. The rollers 11, after entering the access portion 25, are guided into the passage groove 13 and then into the guide cylinder 9 that is connected to the end of the passage groove 13 opposite to the access portion 25. Similarly, the rollers 12, after entering the access portion 26, are guided into the passage groove 14 and then into the guide cylinder 10 that is connected to the end of the passage groove 14 opposite to the access portion 26. At this point, the row of rolling rollers 11 and the row of rolling rollers 12 intersect with each other on either side of the bridge member 15, as can be seen from FIG. 17. This intersection of rows of the rolling rollers is represented by the rollers 11 and 12 in FIG. 14.

The rollers 11 and 12 after having intersected with each other in one end cap 5 or 6 in this manner are guided from the passage grooves 13 and 14 through the guide cylinders 9 and 10 into the other end cap 6 or 5 that is located to the front of the moving direction of the slider S. Then, in the end cap 6 or 5 located to the front of the moving direction, the rollers 11 and 12 are introduced into the ends of the passage grooves 13 and 14 opposite to the access portions 25 and 26. Then, the rows of rolling rollers 11 and 12 intersect with each other while moving through the passage grooves 13 and 14.

Such a conventional linear motion rolling guide unit as described above needs a large number of parts incorporated in the end caps 5 and 6, and in addition the guide cylinders 9 and 10 are independent of these incorporated parts. In consequence, the problem of a significantly low efficiency of the assembly process for the entire unit arises. It is needless to say that another problem is the increase in the manufacturing cost for the parts because of the large number of parts.

Further, when the number of parts incorporated in the end caps is large, the dimensional tolerance and the like of the parts affects the junction between the parts, and inevitably a gap and/or a difference in level easily occur at such a junction. Once the gap and/or the difference in level occur, they cause the rollers 11, 12 to tilt or to catch, or alternatively cause the abrasion of the guide cylinders 9, 10. As a result, the smooth circulation of the rollers 11 and 12 is impeded. A problem rising for this reason is variation in the frictional resistances of the slider S to the track-rail R when the slider S runs on the track-rail R having the raceway faces.

SUMMARY OF THE INVENTION

It is an object of the present invention to provide a linear motion rolling guide unit which has the number of junctions between parts reduced through a reduction in the number of parts in order to overcome the conventional problems.

The present invention provides a linear motion rolling guide unit which is provided with a track-rail which has two raceway faces formed on each of its two sides, and a slider which straddles and moves along the track-rail having the raceway faces and incorporates a plurality of rollers forming four endless rolling rows. In the slider, two sets of outward guide paths for guiding the respective endless rows of the rollers rolling in one direction and return guide paths for guiding the corresponding endless rows of the rollers rolling in the opposite direction are provided on each of the two sides of the track-rail having the raceway faces. The outward guide paths are parallel to the respective raceway faces. The return guide paths extend through the inside of the slider. Each of the outward guide paths and the return guide path paired therewith intersect with each other in an end cap provided in the slider.

In the linear motion rolling guide unit of the present invention, the slider contains a pair of guide holes provided for forming the return guide paths. Guide cylinders in which the rollers roll are inserted in the respective guide holes. The end cap contains a pair of passage grooves having different depths and intersecting with each other. A divider frame is provided integrally with one end of each of the guide cylinders for providing a partition between the intersecting passage grooves. The divider frame is fitted into a cross portion of the passage grooves intersecting with each other, whereby the outward guide path and the return guide path are defined while still intersecting. The types of rollers described in the present invention include a cylindrical roller, a long cylindrical roller, a needle roller and the like.

Further, in the linear motion rolling guide unit of the present invention, the divider frame forms a passage hole enabling the rollers which have moved through the guide cylinder to continue to roll. The outer face of the divider frame serves as a guide face for the rollers which have rolled through another guide cylinder.

According to the present invention, the parts required for forming the return guide path are only the guide cylinders having the divider frames formed integrally therewith and the end caps. In other words, the required number of parts incorporated in the end cap is only one. Hence, as compared with the conventional linear motion rolling guide units, a significant reduction in the manufacturing cost is possible. A small number of parts leads to a reduction in the number of processes for assembly. In consequence, the assembly process can be simplified, which in turn aids in reducing the cost.

Further, the reduced number of parts incorporated in the end cap as described above results in a reduction in the number of junctions. In consequence, the occurrence of gaps and differences in level in the junctions caused by the dimensional tolerance and the like of the parts is reduced. If the gaps and differences in level are not produced in this manner, the disadvantages of the roller tilting or catching or the abrasion of the guide cylinders are eliminated. For this reason, when the slider runs on the track-rail having the raceway faces, a stable frictional resistance of the slider to the track-rail is achieved.

DETAILED DESCRIPTION OF THE PREFERRED EMBODIMENT

FIG. 1 to FIG. 12 illustrate an embodiment of the present invention, in which the principal elements of a slider S are a casing c and a pair of end caps e1 and e2. The slider S moves on a conventional track-rail R having raceway faces as described earlier. The structure of the casing c is practically the same as that of the conventional one. A pair of guide holes 31 and 32 is formed in each of the two side portions of the casing c. Reference numeral 33 in FIG. 1 denotes an underside seal for preventing the intrusion of dust and the like from under the slider S.

The biggest feature of the embodiment is the structure of a guide cylinder 34 incorporated in each of the guide holes 31 and 32. The four guide cylinders 34 used here are identical in shape. All the guide cylinders are designated by the same reference numeral 34. Each of the guide cylinders 34 is composed of a cylinder 35 inserted into the guide hole 31 or 32, and a divider frame 36 formed integrally with the cylinder 35, as can be seen from FIG. 3 to FIG. 6.

Figure 11:
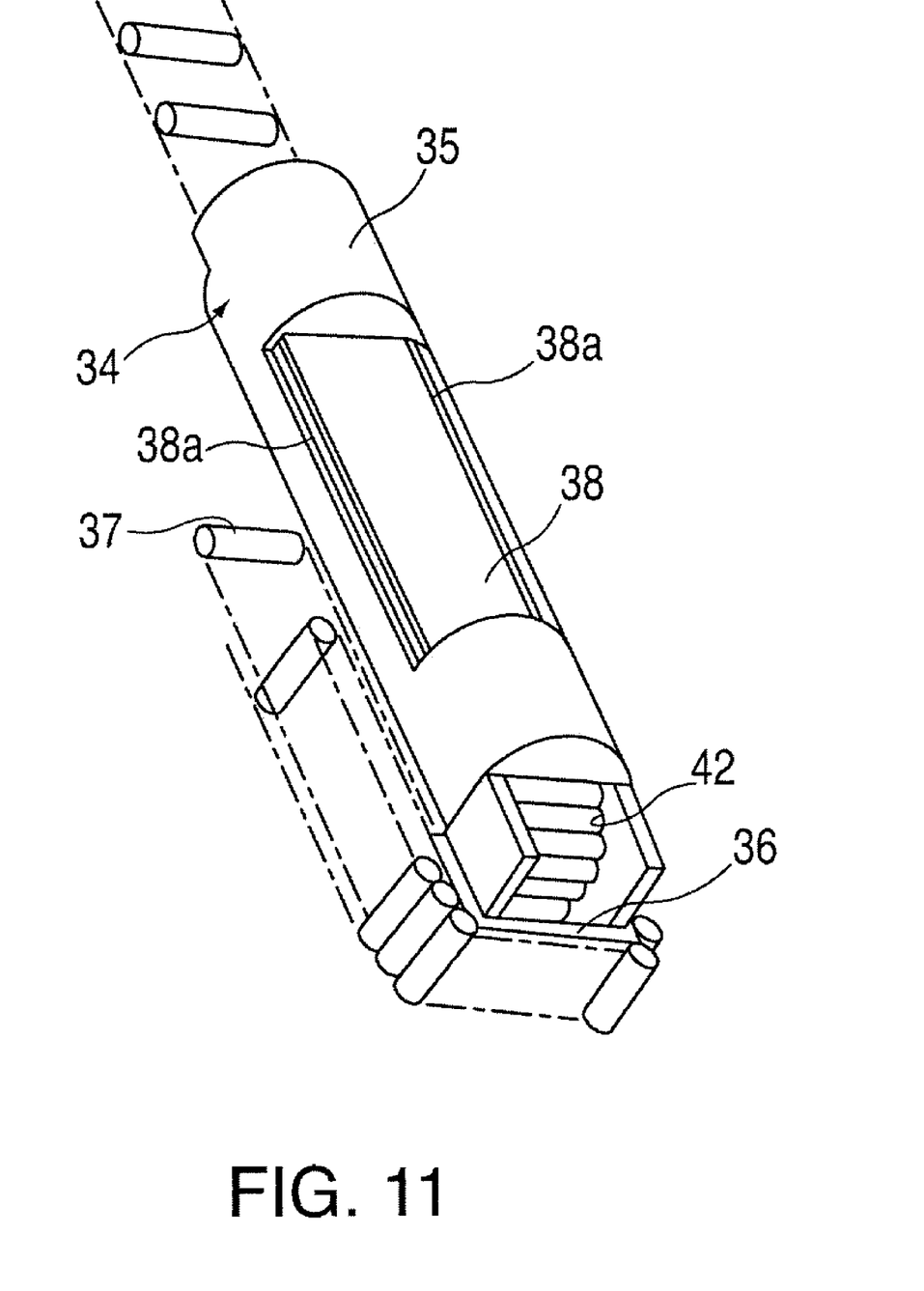
FIG. 11 is a perspective view illustrating the intersection of rows of rolling rollers with each other.

The cylinder 35 has a hollow portion provided for allowing rollers 37 to roll therein, and enables the rollers 37 to roll in the hollow portion with the axis of each roller 37 placed at right angles to the axis of the cylinder 35, as can be seen from FIG. 11. Two slits 38a are formed in the cylinder 35 and extend in the axis direction. A leaf spring 38 is formed between the slits 38a. For example, when the interval between each of the rolling rollers 37 is lessened and the regularly spacing and lining up of the rollers 37 is disturbed, the leaf spring 38 is provided for correcting the disturbed row and elastically retreating.

The divider frame 36 is provided integrally with one end of the cylinder 35, and provided with a passage hole 36a extending in a direction at right angles to the axis of the cylinder 35, and with a surrounding wall 36b on the periphery of the passage hole 36a, as can be seen from FIGS. 3 to 6. As can be seen from FIGS. 6 to 9, a pair of projecting arms 39 is formed integrally with the surrounding wall 36b on the top thereof, or on an extension of the cylinder 35. In addition, a guide piece 40 having an arc-shaped inner face is also formed integrally with the surrounding wall 36b at the lower end of the divider frame 36 located opposite to the projecting arms 39. Further, as can be seen from FIG. 6, a step 49 is formed at the other end of the guide cylinder 34.

The end caps e1 and e2 provided at the respective ends of the casing are identical in structure, so that each of the structural elements is hereinafter described with the same reference numeral. As can be seen from FIG. 2, a pair of passage grooves 42 and 43 is formed in each end cap e1, e2. The passage grooves 42 and 43 intersect with each other. The groove depth of each passage groove 43 is deeper than that of each passage groove 42. Hence, the continuity of the passage groove 42 is obstructed by the passage groove 43. Incidentally, the description is given relating to only one of the right and left passage grooves 42 and one of the right and left passage grooves 43 in each end cap in FIG. 2, as a representative example.

Figure 7:
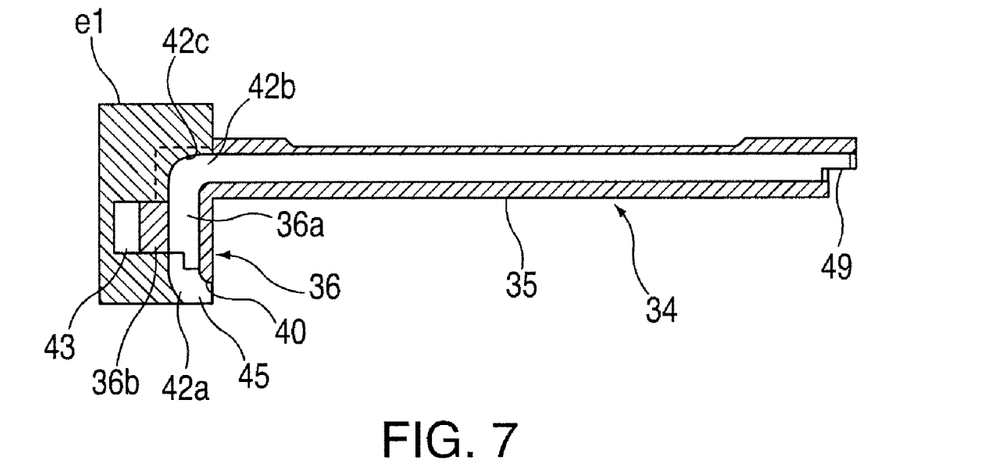
FIG. 7 is a sectional view of the guide cylinder with a divider frame mounted on the end cap.
Figure 10:
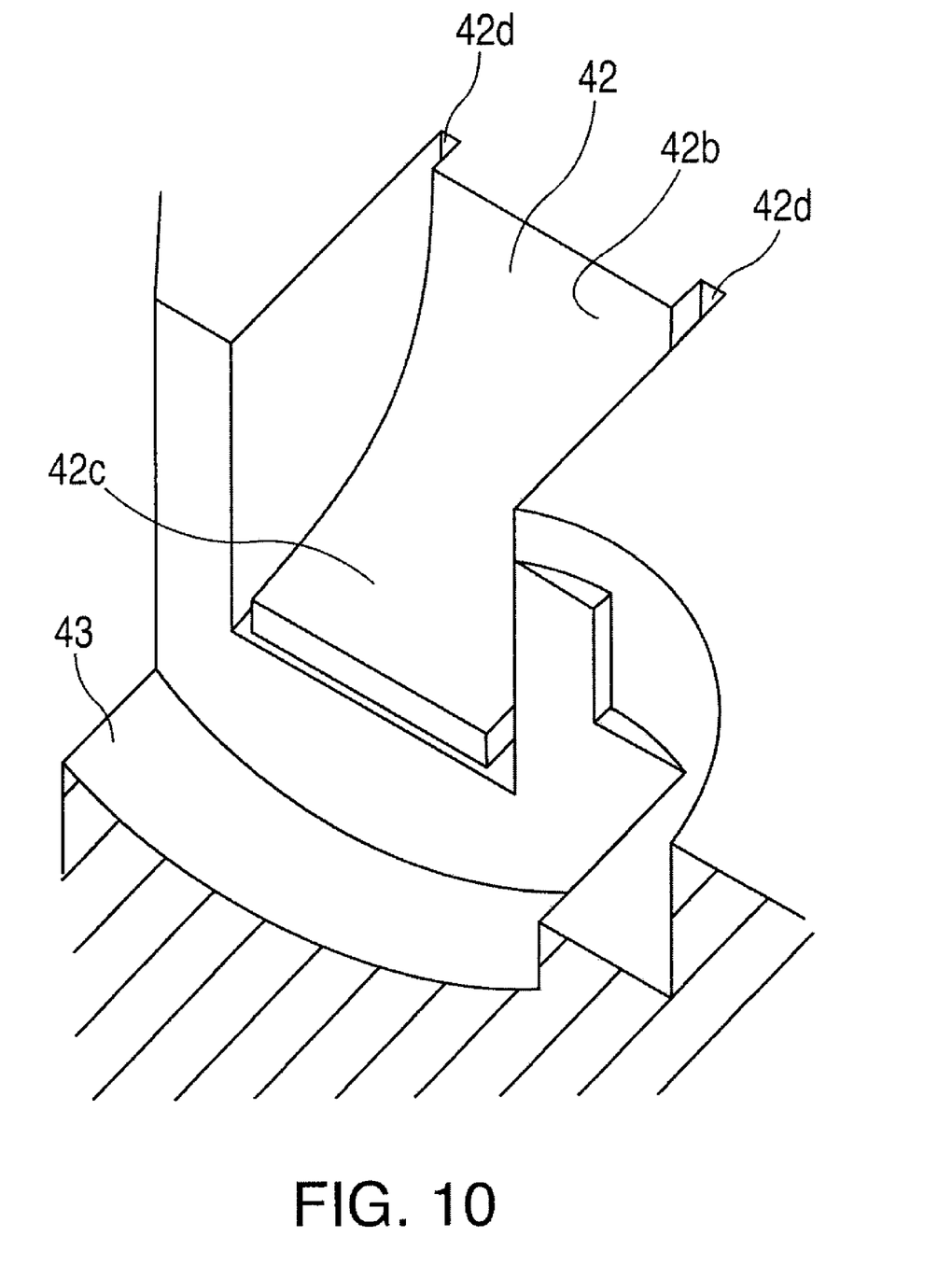
FIG. 10 is a partial perspective view including a partial sectional view of a connection portion of a passage groove in the end cap.

The passage groove 42 has one end serving as an access portion 42a and the other end serving as a connection portion 42b. As illustrated in FIG. 7, the connection portion 42b has a bottom face 42c formed in an arc shape. As illustrated in FIG. 10, receiving grooves 42d are formed on either side of the connection portion 42b, into which the projecting arms 39 formed in the guide cylinder 34 are respectively inserted. By inserting the projecting arms 39 into the receiving grooves 42d, the divider frame 36 of the guide cylinder 34 is placed in a position corresponding to a cross portion 44 between the passage grooves 42 and 43.

As shown in FIG. 7, the divider frame 36 is disposed at the cross portion 44. Specifically, by disposing the divider frame 36 in a position corresponding to the cross portion 44, the discontinuity of the passage groove 42 is reconnected through the passage hole 36a of the divider frame 36, and the passage formed by the passage groove 42 and the passage formed by the passage groove 43 are defined by the surrounding wall 36b of the divider frame 36. At this point, the outer periphery face of the surrounding wall 36b is combined with the passage groove 43 to guide the rollers 37, thus constituting the guide face of the present invention.

Figure 12:
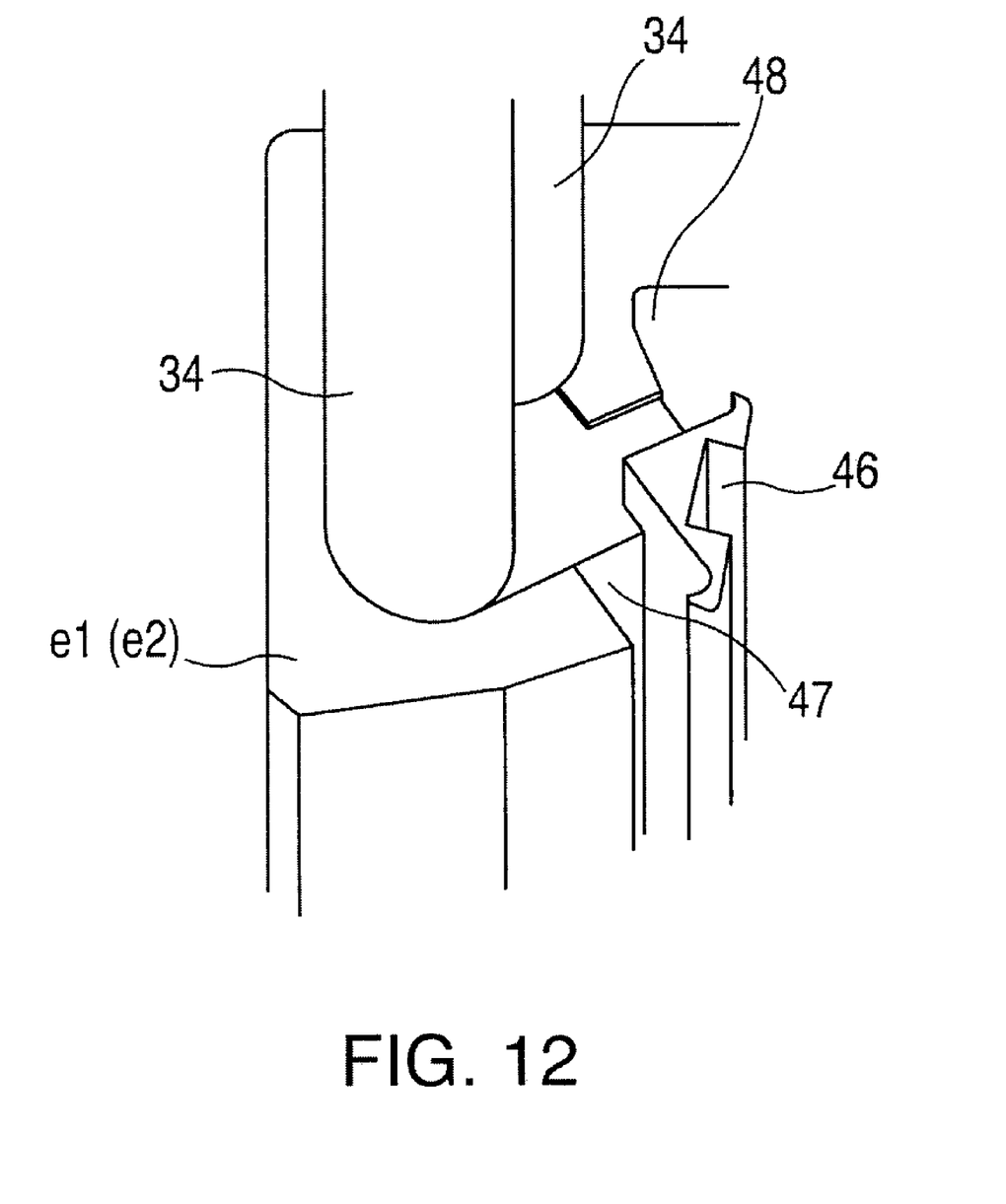
FIG. 12 is a partial perspective view of the guide cylinder installed in the end cap.

When the divider wall 36 of the guide cylinder 34 is fitted into each of the end caps e1 and e2, the passage groove 42 is reconnected. The connection portion 42b is continuous with the cylinder 35 and the access portion 42a is combined with the guide piece 40 to form an introducing portion 45. As illustrated in FIG. 12, a guide piece 46 is formed integrally with each of the end caps e1 and e2, and forms a passage 47 which is structured to be continuous with the raceway face of the track-rail R having the raceway faces.

Figure 2:
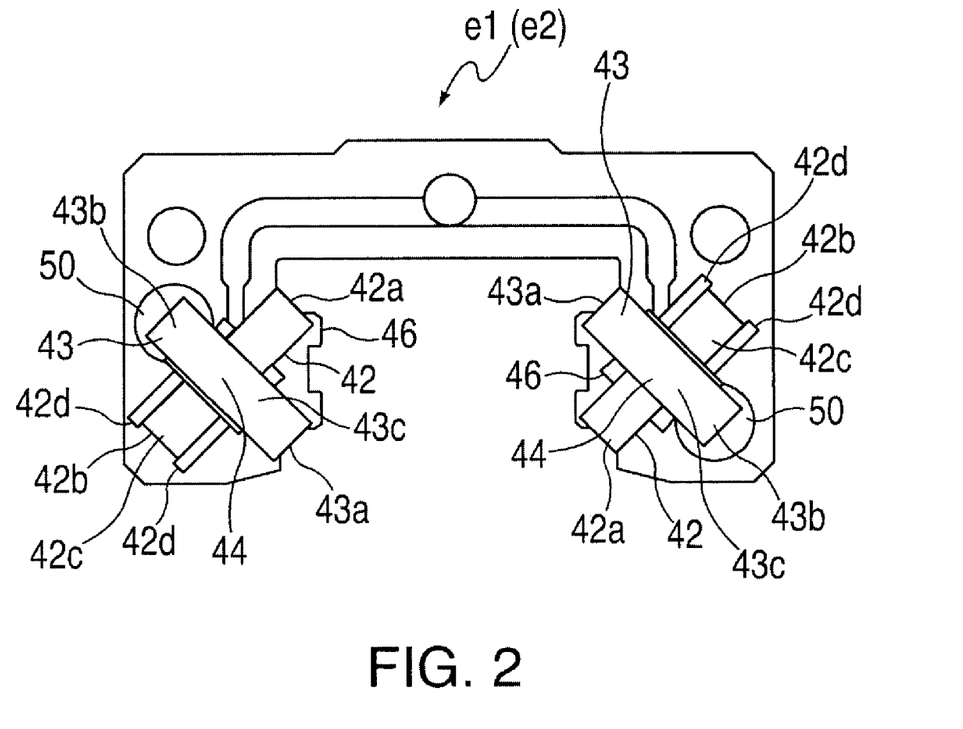
FIG. 2 is a view of an end cap when viewed from a casing.
Figure 3:
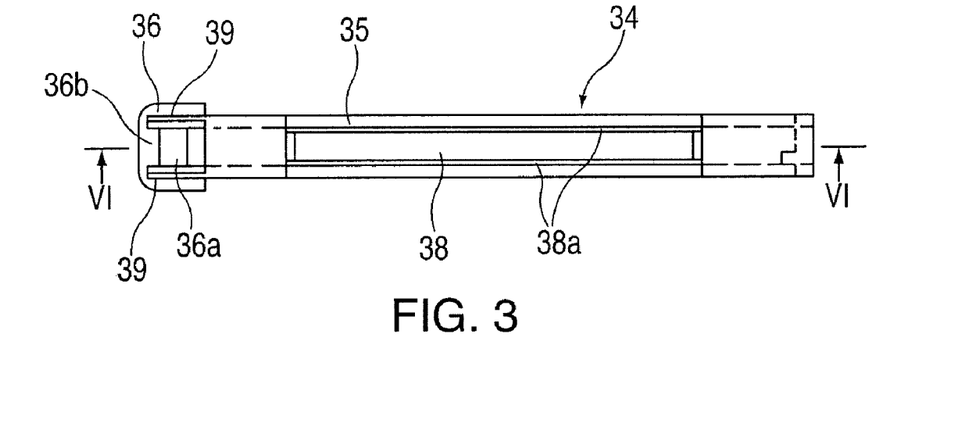
FIG. 3 is a plan view of a guide cylinder.
Figure 4:
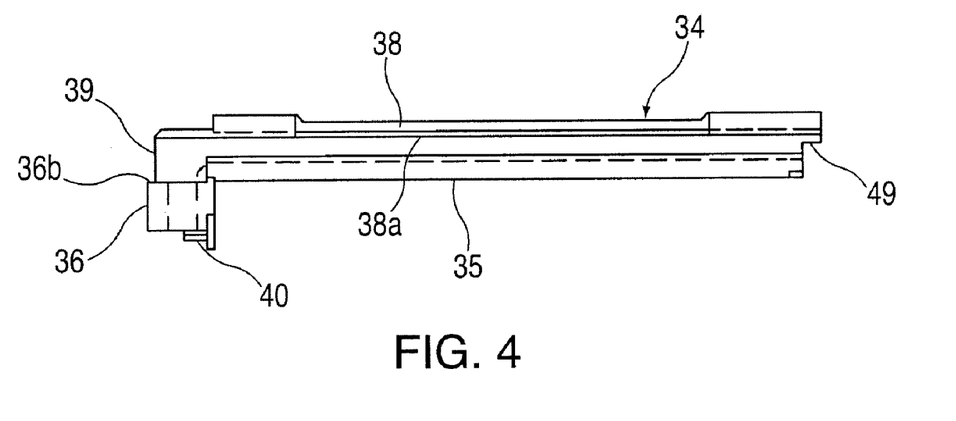
FIG. 4 is a side view of the guide cylinder.
Figure 5:
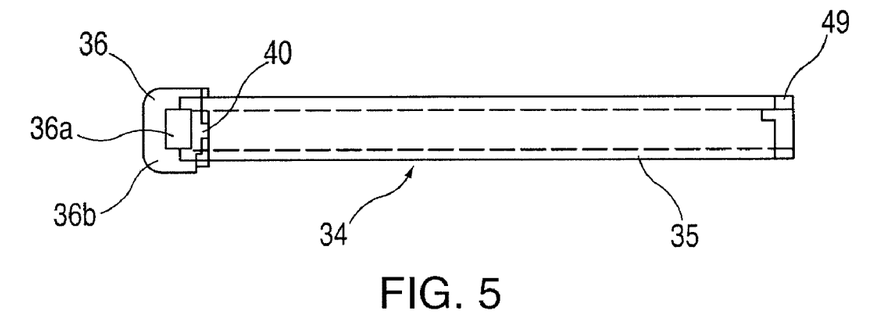
FIG. 5 is a bottom view of the guide cylinder.
Figure 6:
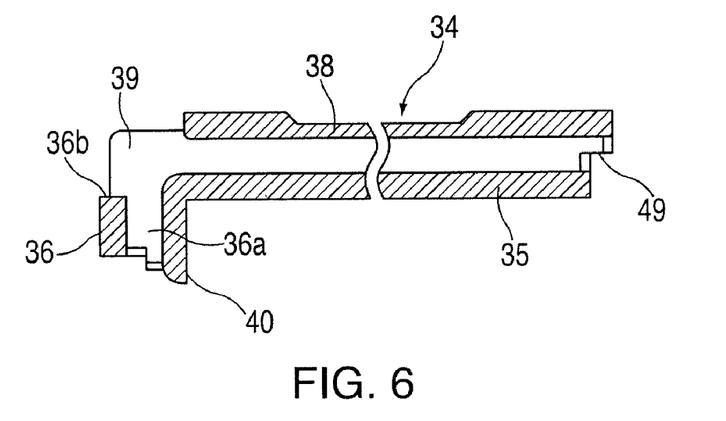
FIG. 6 is a sectional view taken along the VI-VI line in FIG. 3.
Figure 8:
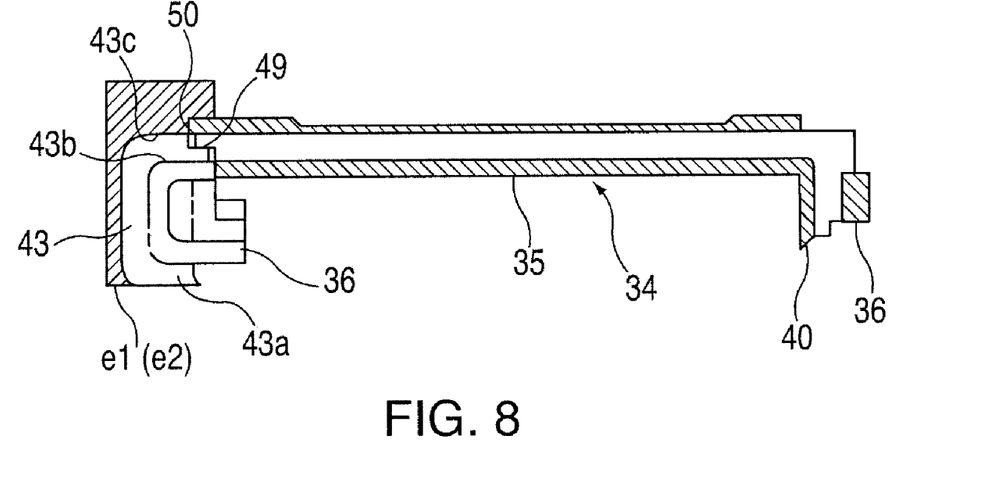
FIG. 8 is a sectional view of the guide cylinder with a step mounted on the end cap.
Figure 9:
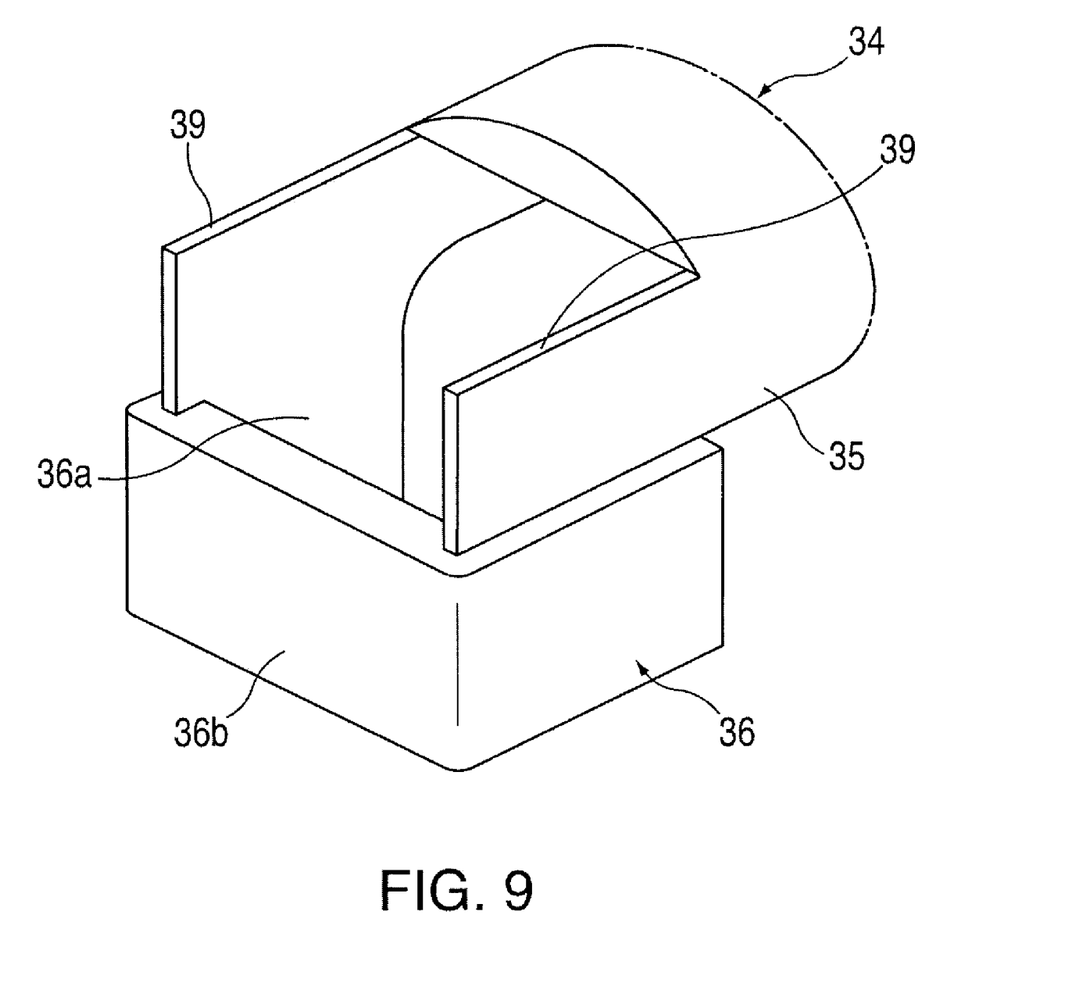
FIG. 9 is a partial perspective view of the divider frame of the guide cylinder.

On the other hand, the passage groove 43 also has one end serving as an access portion 43a and the other end serving as a connection portion 43b. As shown in FIG. 2 and FIG. 8, a step 50 is formed in the connection portion 43b. The bottom face 43c of the connection portion 43b is structured to be continuous with the cylinder 35. The access portion 43a is continuous with a passage 48 formed by the guide piece 46 as shown in FIG. 12. The passage 48 is also structured to be continuous with the raceway face of the track-rail R having the raceway faces.

A step 49 is formed at the other end of the guide cylinder 34. The step 49 is in contact with the step 50 formed in the end cap e1 (e2) as illustrated in FIGS. 2 and 8, in order to achieve a continuous connection between the cylinder 35 of the guide cylinder 34 and the passage groove 43, as illustrated in FIG. 8.

Figure 1:
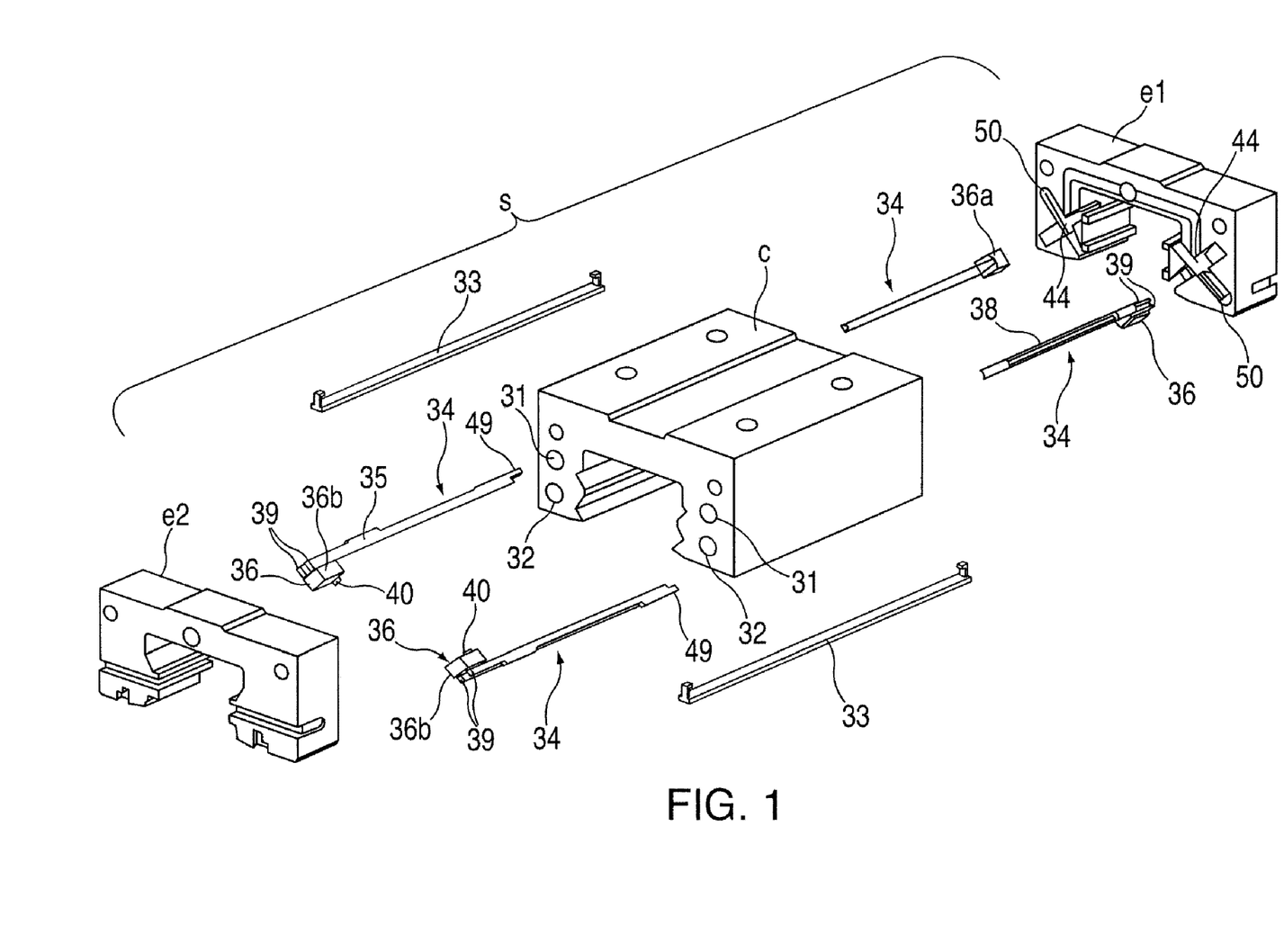
FIG. 1 is a perspective exploded view of a slider according to the present invention.

Next, the assembly process for the components will be described with reference to FIG. 1. Initially, the divider frame 36 of the guide cylinder 34 is fitted into each of the cross portions 44 of each of the end caps e1 and e2. The guide cylinder 34 of which the divider frame 36 is thus fitted into the cross portion 44 is inserted in the guide hole 31 (32) of the casing c. The guide cylinder 34 is formed in dimensions such that the step 49 provided at the end of the guide cylinder 34 opposite the divider frame 36 projects from the casing c when it is inserted in the guide hole 31 (32). The projecting step 49 is adjoined with the step 50 of the end cap e1 (e2), such that the guide cylinder 34 communicates with the passage groove 43.

The guide groove 43 inserted in the guide hole 31 (32) constitutes the return guide path of the present invention. The area continuous with the introducing portion 45 and extending parallel to the corresponding raceway face 1a, 1b, 2a or 2b constitutes the outward guide path of the present invention.

A plurality of rollers 37 is loaded in each of the outward guide paths and each of the return guide paths. A row of rollers 37 rolling in the guide cylinder 34 inserted in the guide hole 31 and a row of rollers 37 rolling in the guide cylinder 34 inserted in the guide hole 32 are formed. The rows of the rolling rollers 37 intersect with each other at the cross portion 44 of each of the end caps e1 and e2 for circulation.

More specifically, for example, the rollers 37 entering the introducing portion 45 (see FIG. 7) of the end cap 1e from the outward guide path move through the passage groove 42 while moving trough the passage hole 36a of the divider frame 36. Then, the rollers 37 are guided from the connection portion 42b of the passage groove 42 to one end of the cylinder 35. The rollers 37 reaching the end of the cylinder 35 move to the other end of the cylinder 35, and are then guided from the other end of the cylinder 35 to the connection portion 43b of the passage groove 43 formed in the other end cap e2, thus passing through the return guide path. The rollers 37 guided to the connection portion 43b of the end cap e2 move through the passage groove 43 in the end cap e2 and reach the introducing portion 45. Then, the rollers 37 are guided, via the passage 48 formed in the end cap e2, to the corresponding raceway face 1a, 1b, 2a or 2b, and then pass through the outward guide path.

The rollers 37, which have moved through the outward guide path, reach the passage 47 formed in the end cap e1, then move to the access portion 42a of the end cap e1, and then repeat the motion through the same route. Whichever way, the rollers 37 rolling between the end caps e1 and e2 roll through the outward guide path and the return guide path while keeping the row of rollers rolling endlessly.

The rollers 37 move in the opposite direction to whichever the moving direction of the slider S is, but the moving route of the rollers 37 is the same as in the foregoing case, and it is simply the rolling direction that is different.

According to the foregoing embodiment, the guide cylinder 34 is formed integrally with the divider frame 36. Hence, the component which must be mounted in each of the end caps e1 and e2 is only the guide cylinder 34. For this reason, the number of parts is significantly reduced and accordingly the number of assembly processes is reduced. If the number of assembly processes is reduced, it is needless to say that this makes a reduction in the total manufacturing cost possible.

The reduction in the number of parts results in a reduction in the number of junctions between parts. In consequence, occurrence of gaps and differences in level in the junctions caused by the dimensional tolerance and the like of the parts as is found in the conventional linear motion rolling guide units is eliminated. Thus, the tilting and catching of the rollers is prevented.

What is claimed is:

1. A linear motion rolling guide unit provided with a track-rail which has two raceway faces formed on each of two sides thereof, and a slider which straddles and moves along the track-rail having the raceway faces and incorporates a plurality of rollers forming four endless rolling rows, and comprises two sets of outward guide paths for guiding the respective endless rows of the rollers rolling in one direction and return guide paths for guiding the corresponding endless rows of the rollers rolling in the opposite direction which are provided on each of the two sides of the track-rail having the raceway faces, the outward guide paths being parallel to the respective raceway faces, the return guide paths extending through the inside of the slider, each of the outward guide paths and the return guide path paired therewith intersecting with each other in an end cap provided in the slider, wherein the slider comprises a pair of guide holes provided for forming the return guide paths, and respectively receiving insertion of guide cylinders in which the rollers roll, the end cap comprises a pair of passage grooves having different depths and intersecting with each other, and a divider frame is provided integrally with one end of each of the guide cylinders for providing a partition between the intersecting passage grooves, and is fitted into a cross portion of the passage grooves intersecting with each other, whereby the outward guide path and the return guide path are defined while still intersecting.

2. A linear motion rolling guide unit according to claim 1, wherein the divider frame forms a passage hole enabling the rollers which have moved through the guide cylinder to continue to roll, and the outer face of the divider frame serves as a guide face for the rollers which have rolled through another guide cylinder.

* * * * *